(12) United States Patent
Walia et al.

(10) Patent No.: US 9,626,228 B1
(45) Date of Patent: Apr. 18, 2017

(54) SYNCHRONIZING STATELESS PROCESS ACROSS MULTIPLE INSTANCES

(71) Applicant: EMC Corporation, Hopkinton, MA (US)

(72) Inventors: Raman Walia, Bangalore (IN); Prasad K. Thotakura, Bangalore (IN); Ashraf A. Syed, Bangalore (IN); Vasanth Kumar Somasundaram, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/172,152

(22) Filed: Feb. 4, 2014

(51) Int. Cl.
*G06F 9/44* (2006.01)
*G06F 15/16* (2006.01)
*G06F 9/46* (2006.01)
*G06F 9/52* (2006.01)

(52) U.S. Cl.
CPC . *G06F 9/52* (2013.01); *G06F 8/34* (2013.01)

(58) Field of Classification Search
CPC .......................................................... G06F 9/52
USPC ......................................................... 717/109
See application file for complete search history.

(56) References Cited

U.S. PATENT DOCUMENTS

| | | | |
|---|---|---|---|
| 6,081,665 A * | 6/2000 | Nilsen et al. ................. | 717/116 |
| 6,314,563 B1 * | 11/2001 | Agesen et al. ................ | 717/108 |
| 6,622,155 B1 * | 9/2003 | Haddon ................... | G06F 9/443 |
| | | | 709/201 |
| 6,851,105 B1 * | 2/2005 | Coad et al. .................... | 717/106 |
| 7,210,145 B2 * | 4/2007 | Srinivasan .................... | 718/100 |
| 7,246,344 B1 * | 7/2007 | Christensen et al. ......... | 717/109 |
| 2005/0097538 A1 * | 5/2005 | Laura ............................ | 717/162 |
| 2007/0226683 A1 * | 9/2007 | Stoodley et al. ............. | 717/106 |
| 2010/0293401 A1 * | 11/2010 | de Cesare et al. ............ | 713/320 |
| 2012/0316851 A1 * | 12/2012 | Dalal ........................ | G06F 8/34 |
| | | | 703/6 |
| 2014/0032606 A1 * | 1/2014 | Chandler .................. | G06F 8/34 |
| | | | 707/798 |

OTHER PUBLICATIONS

Zilbergleyt et al. "Is there a way to 'synchronize' a stateless session bean's business method?" Sep. 20, 2005, published online at <http://www.coderanch.com/t/317023/EJB-JEE/java/synchronize-stateless-session-bean-business>.*
Chin et al. "Using synchronized block in stateless session bean" Aug. 24, 2006, published online at <http://www.coderanch.com/t/318558/EJB-JEE/java/synchronized-block-stateless-session-bean>.*
Petzold, "Programming Windows®, Six Edition" Jan. 15, 2013, Microsoft Press, Chapter 3.*

* cited by examiner

*Primary Examiner* — James D Rutten
(74) *Attorney, Agent, or Firm* — Van Pelt, Yi & James LLP (57) ABSTRACT

Synchronization stateless process execution is disclosed. In various embodiments, an indication is received that an instance of a process with respect to which stateless execution is being performed is to enter a block of the process with respect to which synchronization with one or more other instances of the process is to be provided. A current turn to perform the block with respect to which synchronization is to be provided is secured on behalf of the process instance. The block with respect to which synchronization is to be provided is allowed to be performed by the process instance.

19 Claims, 5 Drawing Sheets

SYNCHRONIZING STATELESS PROCESS ACROSS MULTIPLE INSTANCES

BACKGROUND OF THE INVENTION

Application development tools enable developers to create applications quickly, without having to write code, e.g., in a programming language, to provide the application functionality desired. Advanced tools, such as the xCP™ application development tool provided by EMCC® Corporation, enable application developers to define application processes to be performed at runtime, e.g., to create or modify data objects. Application code may be generated to invoke a stateless process execution engine at runtime to perform such application processes. These advanced tools may make it possible for a developer to define processes that could at runtime attempt to act upon the same data at the same time, e.g., via multiple threads and/or across application process instances running in multiple different Java Virtual Machine (JVM) and/or other runtime environments.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details.

Synchronizing stateless process execution, e.g., across multiple threads and/or process instances, is disclosed. To avoid data corruption by multiple threads, a "synchronize" construct typically may be provided in the semantics of a programming language. Providing synchronization in the context of an application composed by a developer using a developer tool, instead of by writing code in an advanced programming language that enables the programmer to invoke a synchronize construct of the programming language to provide synchronization, is disclosed. In various embodiments, a visual or other development tool interface is provided to enable a developer to define an application process to be performed by the application, and to indicate an extent to which synchronization among multiple threads and/or instances of the application process is to be provided at application runtime. Application code to perform the application process, via execution of one or more instances of the application process in a stateless process engine, and to synchronize processing across threads and/or JVM or other instances of the process, is generated programmatically. In some embodiments, the generated code is configured to invoke at application runtime a stateless process engine associated with an application framework (e.g., runtime environment) in a manner that provides synchronization among threads and/or other instances of the application process to an extent defined by the application developer using the development tool. For example, in some embodiments, a visual or other application development user interface is provided to enable a developer to identify a set (e.g., a subset) of processing steps of the developer-defined application process with respect to which steps synchronization is to be provided.

Figure 1:
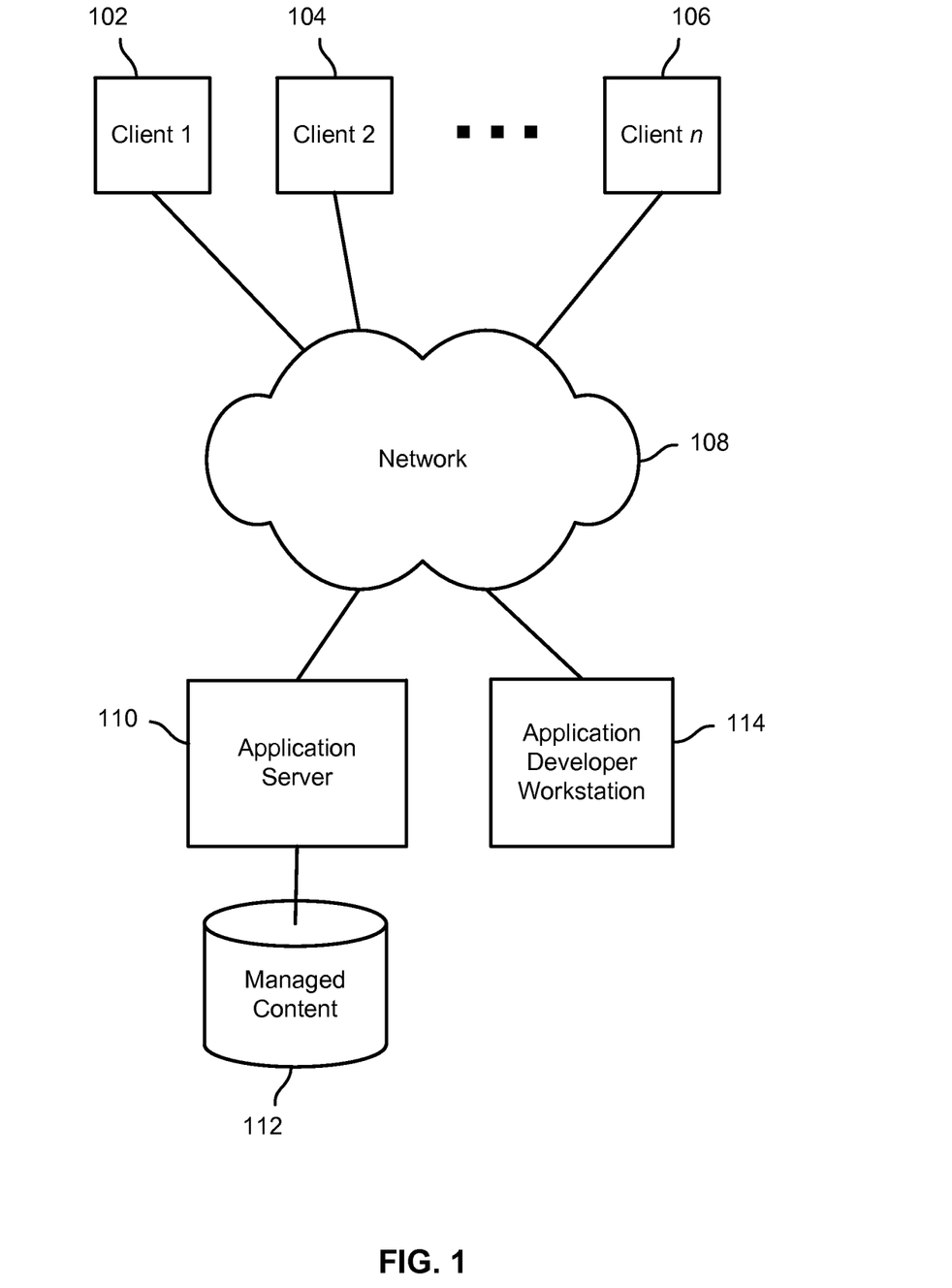
FIG. 1 is a block diagram illustrating an example embodiment of an application development system and environment.

FIG. 1 is a block diagram illustrating an example embodiment of an application development system and environment. In the example shown, a plurality of client systems, representing in FIG. 1 by client systems 102, 104, and 106, connect via a network 108 to an application server 110 associated with a body of managed content 112. In some embodiments, the managed content 112 may be stored in a content management system, such as an EMC® Documentum® system. In various embodiments, a software developer or other user associated with application developer workstation 114, e.g., a personal or other computer, may use a software development tool to create an application to run on application server 110. For example, in some embodiments a developer may use the "xCP Designer" and/or other components comprising the EMC® Documentum® xCP development platform to create applications to run on application server 110, for example in a runtime environment provided on application server 110. The EMC® Documentum® xCP development platform, for example, enables a developer to use visual and other tools to build custom applications that leverage the advanced enterprise content management (ECM) capabilities of EMC® Documentum®.

In various embodiments, a visual or other development tool interface to enable developers to compose developer-composed application elements, such as user interface element (e.g., page element) definitions, is provided, e.g., via application development workstation 114. Definitions are received via the interface and stored. The definitions may include in various embodiments definitions of one or more processes to be embodied in and performed by the application. The process definitions may include in various embodiments an indication of an extent to which processing is desired to be synchronized across multiple threads and/or other instances of the process. The definitions are used to generate application code which at runtime invokes an application framework, e.g., a stateless process engine comprising a runtime or other environment comprising application server 110, to perform and synchronize processing according to the process definitions defined by the developer.

Figure 2:
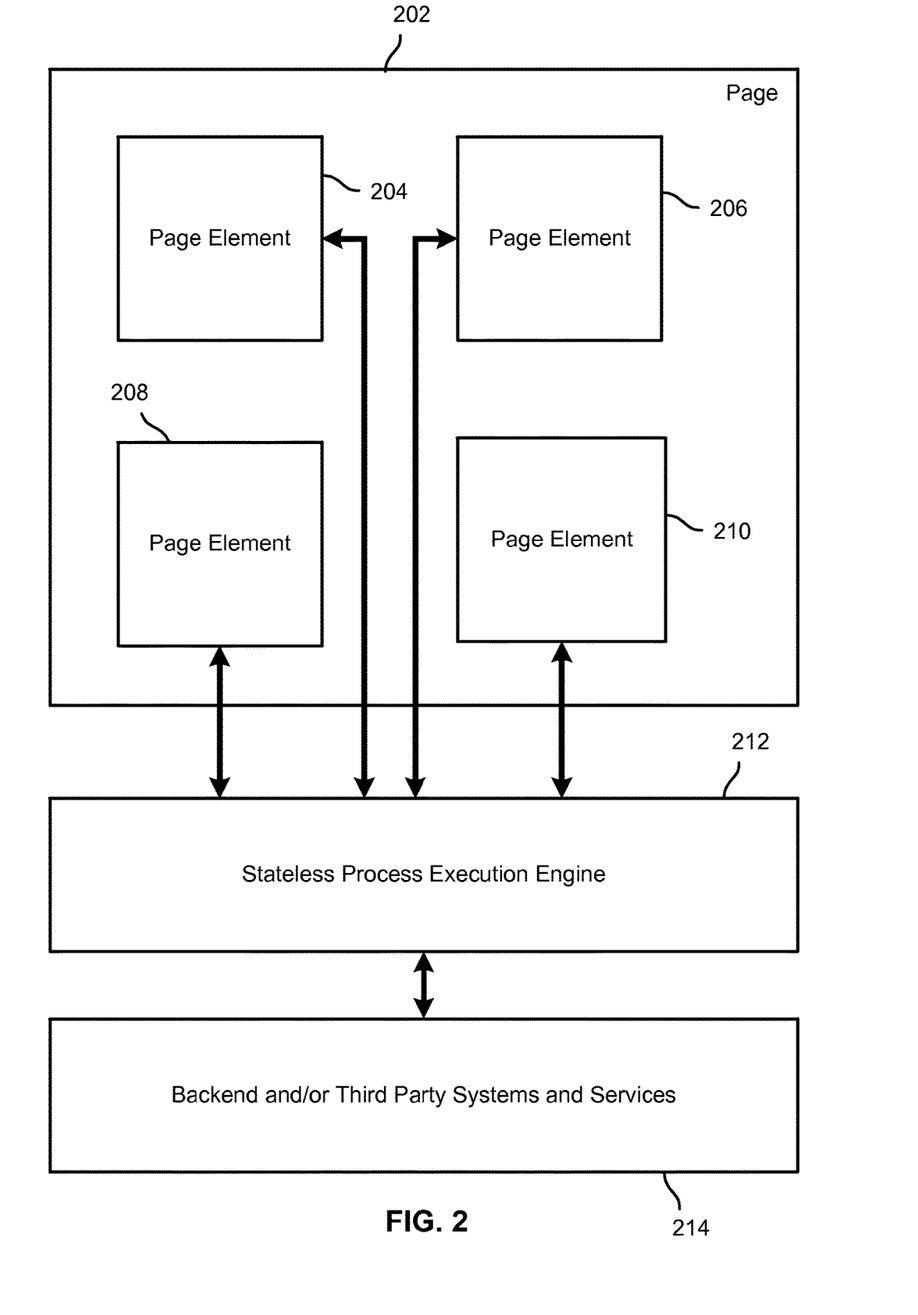
FIG. 2 is a block diagram illustrating an example embodiment of a system to synchronize stateless process execution.

FIG. 2 is a block diagram illustrating an example embodiment of a system to synchronize stateless process execution. In some embodiments, the example application user interface page of FIG. 2 may be provided by executing application user interface code generated using a definition provided via an application developer tool, such as on running on application developer workstation 114 of FIG. 1. In the example shown, the application user interface page 202 may be provided, for example, by downloading associated page source code from an application server, such as application server 110 of FIG. 1, to a client system, such as clients 102, 104, and 106 of FIG. 1, to be displayed at the client system, e.g., using a browser software. The page 202 includes in this example a plurality of page elements 204, 206, 208, and 210, each configured to perform one or more actions, e.g., as defined by a developer using a software development tool as disclosed herein. The respective actions of the page elements 204, 206, 208, and 210 are performed in the example shown by invoking a stateless process execution engine 212. As the respect page elements 204, 206, 208, and 210 take actions by invoking the stateless process execution engine 212, the engine 212 performs associated processing, e.g., by accessing one or more backend servers or other system and/or services 214, including in some embodiments third party systems and services, such as by sending a web services or other service request to a third party. In various embodiments, the stateless process execution engine 212 is "stateless" in the sense that processing is performed as requested, including without limitations requests to backend systems and/or services and/or third party systems and/or services, within maintaining state information with respect to such transactions. As responses are received by stateless process execution engine 212 from invoked backend and/or third party systems and/or services, the results are returned to the page element that initiated the associated requested, e.g., page element 204, 206, 208, or 210.

In various embodiments, synchronization is provided with respect to stateless process execution by engine 212, as defined by a developer via an application development tool interface. In some embodiments, upon receiving a request to perform stateless processing, stateless process execution engine 212 and/or another component not shown in FIG. 2 determines whether and/or an extent to which synchronization is to be performed with respect to the process requested to be performed. For example, a determination may be made as to whether synchronization has been defined to be provided with respect to the process, and/or with respect to which steps of the process synchronization is to be performed.

In various embodiments, if it is determined that synchronization is to be performed with respect to the process and/or some portion thereof, e.g., a defined block comprising two or more steps of the process, the stateless process execution engine 212 and/or another component not shown in FIG. 2 executes the process in a manner that provides such synchronization. For example, if in developing the application the developer indicates that synchronization is to be performed across multiple threads with respect to specific steps of the process, in various embodiments, the stateless process execution engine 212 and/or another component not shown in FIG. 2 provides synchronization in accordance with the process definition. For example, a synchronization data structure, synchronization object, or some other structure or entity may be used to ensure that only one instance of the process at a time modifies a data object with respect to which synchronization is to be provided.

In some embodiments, a synchronization object or other control object or structure may be locked by or on behalf of a process instance seeking to interact with a resource (e.g., data object) with respect to which synchronization is to be provided. If the lock is obtained successfully, the process instance is allowed to interact with (e.g., modify) the resource with respect to which synchronization is being provided. If the control object is already locked, e.g., by or on behalf of another thread or instance of the process, then the instance attempting to lock the object is required to wait until the control object is available to be locked by or on behalf of the instance that could not obtain the lock. While in the foregoing embodiment locking a control object is used to synchronize access to a resource by process threads or other instances, any appropriate implementation may be used to provide synchronization as disclosed herein.

Figure 3:
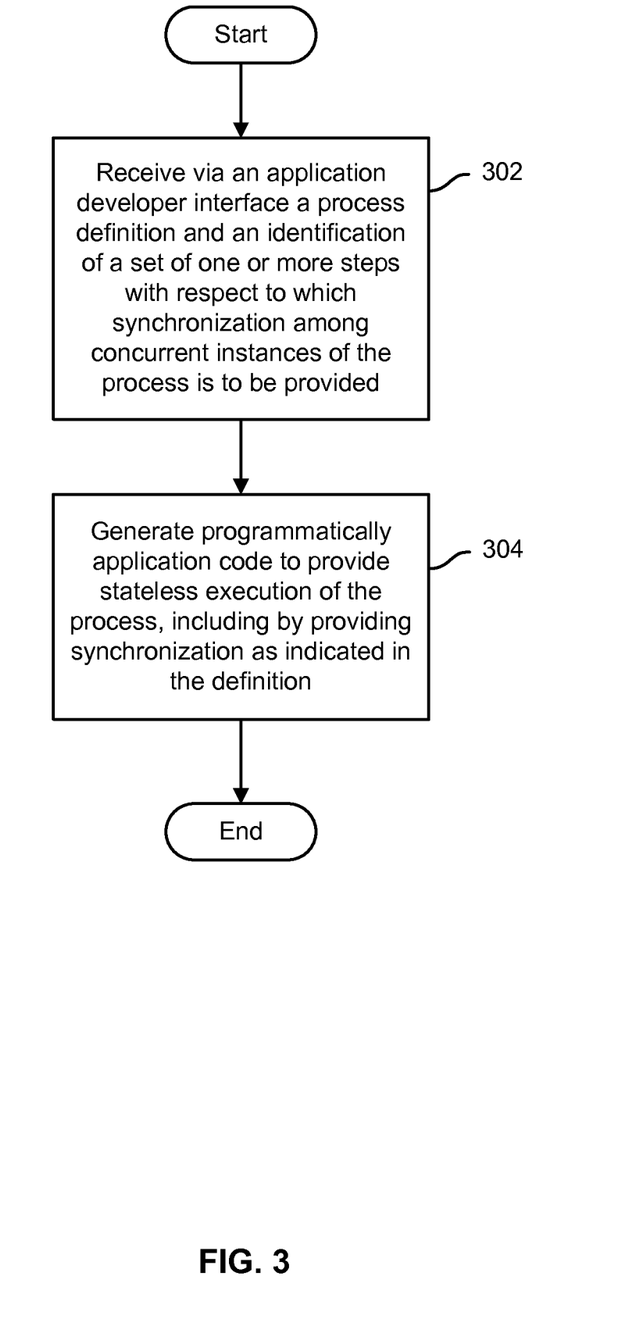
FIG. 3 is a flow chart illustrating an example embodiment of a process to define and provide an application configured to synchronize stateless process execution.

FIG. 3 is a flow chart illustrating an example embodiment of a process to define and provide an application configured to synchronize stateless process execution. In some embodiments, the process of FIG. 3 may be implemented by a developer workstation, such as application developer workstation 114, and/or associated systems and components. In the example shown, an application process definition is received via an application development tool user interface, the definition including in this example a set of one or more steps with respect to which synchronization is to be provided among concurrently running threads or other instances of the application process being defined (302). The process definition is used to generate programmatically application code to provide stateless execution of the defined application process, including by providing synchronization across multiple threads and/or instances, as indicated in the definition (304). For example, application code may be generated to perform the each thread or instance of the application process defined by the developer (302) by invoking a stateless process engine such as engine 212 of FIG. 2 in a manner that ensures the synchronization is performed as indicated in the process definition. For example, if the process definition includes three steps and indicates synchronization across threads and/or instances is to be provided with respect to just a final step of the process (302), application code may be generated (304) to invoke a stateless process execution engine, such as stateless process execution engine 212 of FIG. 2, in a manner that results in the first two steps of the process being performed without synchronization, e.g., two or more threads/instances may be allowed to perform the first two steps simultaneously, while ensuring synchronization with respect to the final step.

In some embodiments, the generated application code (304) may associate with the process one or more methods to ensure synchronization with respect to the step(s) with respect to which synchronization is to be provided as indicated by the developer in the definition (302) and/or to include or otherwise associate with the application process an attribute or other data value indicating that synchronization is to be provided at application runtime across threads/instances of the process with respect to the step(s) indicated in the definition. In some embodiments, a stateless process execution engine, such as stateless process execution engine 212 of FIG. 2, may be configured to interpret the data value indicating that synchronization is to be provided at application runtime across threads/instances of the process and in response ensure synchronization is provided in accordance with the definition.

In some embodiments, a received application process definition (302) may indicate a domain or scope across/within which synchronization is to be provided. For example, in various embodiments, an application developer may indicate in the application process definition that synchronization is to be provided across threads or instances of the process running on the same application user interface page, with respect to instances running across application user interface pages associated with a current application user session, and/or across application instances, e.g., across instance running in multiple different JVM or other runtime environment instances. In some such embodiments, application code is generated to ensure synchronization across application process instances within the domain indicated by the developer in the application process definition.

Figure 4:
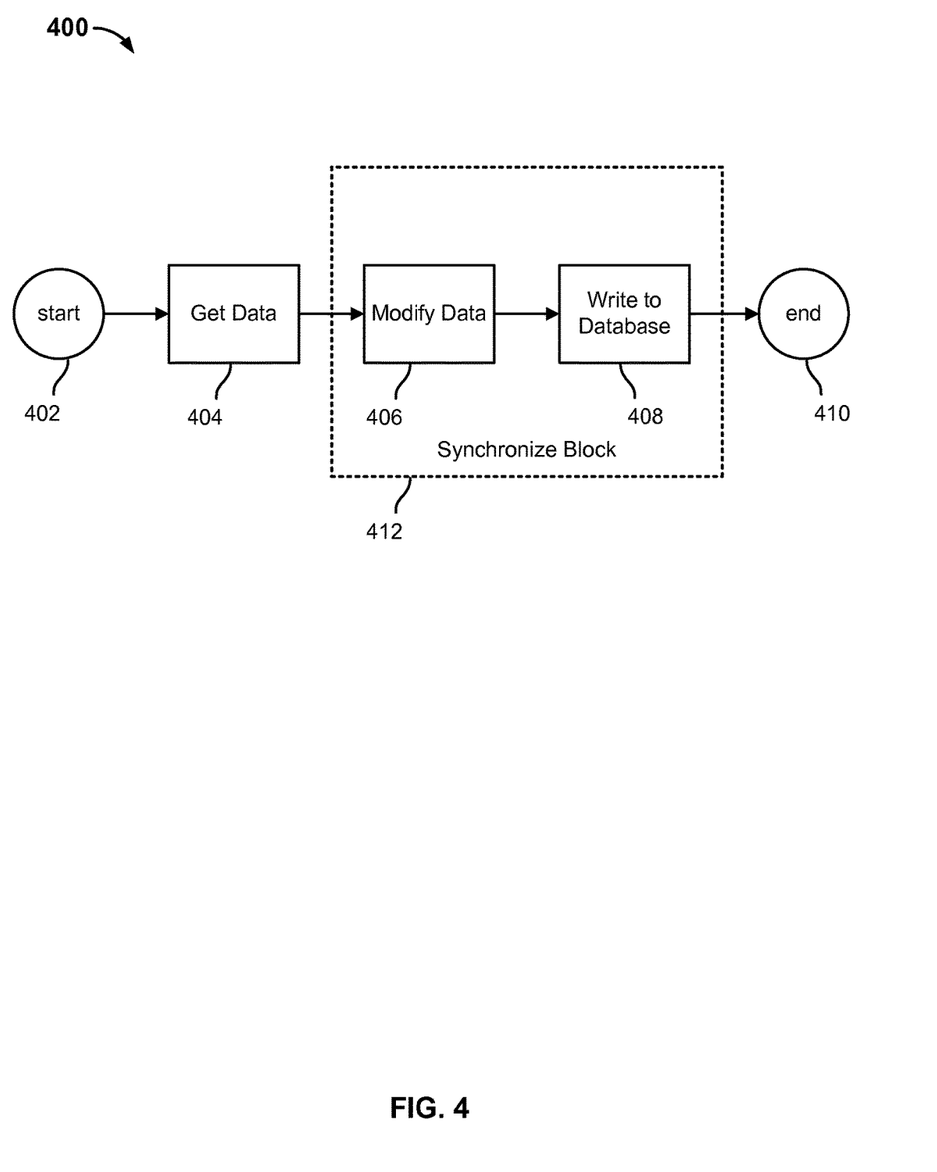
FIG. 4 is a block diagram illustrating an example embodiment of an application development tool user interface.

FIG. 4 is a block diagram illustrating an example embodiment of an application development tool user interface. In some embodiments, the application development tool user interface of FIG. 4 may be provided via an application developer workstation, such as application developer workstation 114 of FIG. 1. In some embodiments, the application development tool user interface of FIG. 4 may be used by a developer to define an application process, including by indicating one or more application process steps with respect to which synchronization is to be provided across threads/instances of the application process, as in step 302 of FIG. 3. In the example shown, a process 400 has been defined, for example by using an application development tool to drag into a composition area and drop the respective elements shown in FIG. 4, such as processing steps 402, 404, 406, 408, and 410. In this example, the process 400 has been defined to begin in a start step 402 and advances to a "get data" step 404, e.g., reading stored data, receiving user input, etc. Data is modified in a "modify data" step 406 and the modifications are written to database in step 408, after which the process ends at step 410. In this example, a set of steps with respect to which synchronization is to be provided among concurrently running instances of the process 400 has been indicated by the developer to include steps 406 and 408, as indicated in this example by the dashed line rectangle 412 shown to include steps 406 and 408 within a "synchronize block". For example, the developer may have dragged the rectangle 412 onto the composition area and adjusted its size and position to encompass steps 406 and 408; or the developer may have selected steps 406 and 408 by some other gesture and the development tool user interface may have drawn rectangle 412; or some other selection interface or gesture may have been used. In various embodiments, a development tool user interface may enable a developer to define a process using a visual interface, such as the example shown in FIG. 4, including by indicating steps with respect to which synchronization is to be performed; to save the process definition; and, ultimately, to generate programmatically application code that includes code to use a stateless process execution engine to perform the process in a manner that provides synchronization as indicated in the definition.

Figure 5:
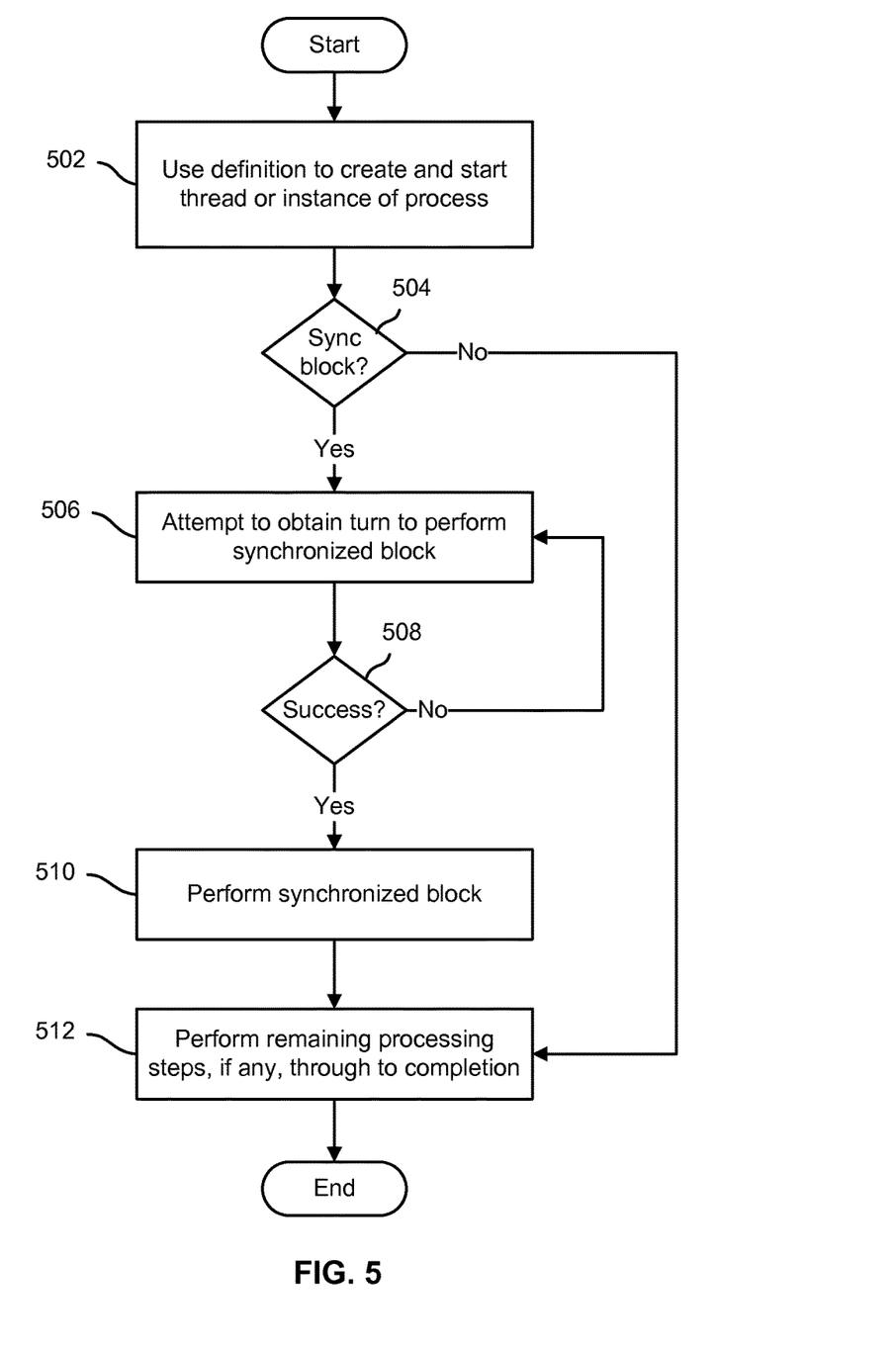
FIG. 5 is a flow chart illustrating an example embodiment of a process to synchronize stateless process execution.

FIG. 5 is a flow chart illustrating an example embodiment of a process to synchronize stateless process execution at application runtime. In some embodiments, an application and/or application framework, running for example on a client system such as clients 102, 104, and 106 of FIG. 1, may perform the process of FIG. 5, for example based at least in part on a process definition created by an application developer as described above in connection with the application process definition process of FIG. 3 and/or the application development tool user interface of FIG. 4. In the example shown, a process definition is used to create and start an instance of a process (502). For example, a developer-composed application user interface page that includes an element configured to perform or invoke the process may have been loaded. If while performing the process a portion (e.g., specific step or block of steps) with respect to which synchronization is to be provided is encountered (504), an attempt is made to get a turn for the current instance to perform the step or block of steps with respect to which synchronization is being provided. A "turn" as used herein means an instance where computing resources (e. g., processor cycles, a software object, a data object, a remote computing system) are made exclusively available to a process instance/thread. For example, if a synchronization object is used to provide synchronization, an attempt may be made to access and lock the synchronization object. In other implementations, other actions to get a turn to perform a block with respect to which synchronization is being provided may be performed. Other examples of action that may be taken to obtain a turn to execute a portion of an application process with respect to which synchronization is to be provided include, without limitation, obtaining a lock; receiving a token; obtaining an electronic ticket representing a place in line; reading a lock, flag, or other synchronization control data value; and/or writing to a lock, flag, or other data value. If a turn to perform the synchronized block is secured (508), the synchronized block is performed (510), and any remaining steps (e.g., following the block with respect to which synchronization is provided) are performed (512) through to the process end. If a turn to perform the block with respect to which synchronizations is to be provided is not immediately obtained (508), e.g., a synchronization object is found to have already been locked by another instance of the process, then the process instance (and/or application framework) waits and tries again, for example after a prescribed wait interval.

The following comprise a non-exhaustive set of example use cases in which synchronization of stateless process execution may be provide as disclosed herein. In various embodiments, the process of FIG. 5, running on a client system such as client 102, 104, or 106 of FIG. 1, may provide synchronization as described in the example, e.g., by executing application code defined and generated as described in connection with FIG. 3:

Example 1

A developer may define an application process that checks to see if a certain folder or other logical structure exists, creates the folder (or other structure) if it does not already exist, and places a data object created and/or modified by the application process into the folder. For example a "customer", "loan application", or other folder may be sought to be created and/or populated by more than one stateless process and/or multiple threads or other instances thereof. Absent synchronization, two or more threads may check at about the same time and determine that the required folder does not yet exist, and each may attempt to create the same folder. With synchronization as disclosed herein, for example, only one of the threads would be permitted to perform at least a synchronized part of the process at a time. For example, a first application process thread may obtain a lock, token, or other atomic "turn" to perform the synchronized portion, e.g., to check for a "loan application" folder for documents associated with a loan application, use an existing one if found, and if not found create and use the newly created folder. If while the first application process thread has obtained a turn to perform the steps with respect to which synchronization is provided a second application process thread attempts to get a turn to perform those steps with respect to the same loan application, e.g., to store other loan application documents the second thread has created or obtained, the second application process thread would not be able to get a turn to perform the synchronized steps and would have to wait for a turn. By the time the second thread obtained a turn, in this example, it would find that the loan application folder for the loan application had already been created, in this example by the first thread, thereby avoiding a collision or other conflict that may have resulted had the first and second threads been executed in a stateless process execution engine without synchronization.

Example 2

An application process (and therefore instances thereof) may be configured to obtain a unique identifier, for example for a folder or other logical structure, a new customer, a loan application or other business work flow instance, etc., at least in part by checking a last used value, incrementing the value, and using the incremented value as the unique identifier. If two threads were to check the last used value before either of them had incremented same, the two threads might each use the same value as an identifier for different entities (e.g., customer, folder, etc.). As disclosed herein, access to read and modify the stored value, or a snippet of code to do same, may be synchronized using techniques disclosed herein to ensure that only one thread (or other instance) of the process would have access to read and increment the stored value at any given time.

Example 3

An application user interface page, or other application construct, may include more than one element configured to modify a same data object on a back end system, or stored externally by a third party system or service, etc. Absent synchronization, an attempt by a second thread to modify an object that is already in the process of being modified by a first thread may result in an error being returned. In various embodiments, synchronization provided as disclosed herein may be used to ensure that synchronization of attempts by the respective threads to modify the data object is provided.

In various embodiments, synchronization of stateless process execution may be provided as disclosed herein. Access to any resource with respect to which synchronized access is desired, such as backend data objects, backend or third party systems or services, etc., may be provided, while taking advantage of the relative simplicity, flexibility, and performance (e.g., speed) associated with using a stateless process engine.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of synchronizing stateless process execution, comprising:
receiving, by a stateless process execution engine, an indication that an instance of a process with respect to which stateless execution is being performed is to enter a block of the process with respect to which synchronization with one or more other instances of the process is to be provided, wherein the indication is provided according to an application process definition, wherein the application process definition identifies one or more instances of the process running on a same application user interface page to which synchronization is to be provided, wherein the block of the process with respect to which synchronization is to be provided is identified in a process definition associated with the process, wherein the process definition is received via a development tool user interface, wherein the development tool user interface includes an interface to graphically select one or more blocks of the process definition when displaying the process definition, wherein the graphical selection causes synchronization to be provided to the one or more selected blocks, wherein the development tool user interface is associated with a development platform configured to generate programmatically application code to implement the process, via execution of one or more instances of the process running on the same application user interface page in a stateless process engine;
securing, by the stateless process execution engine, on behalf of the instance of the process a current turn to perform the block with respect to which synchronization is to be provided; and
allowing, by the stateless process execution engine, the block with respect to which synchronization is to be provided to be performed by the instance of the process running on the same application user interface page, wherein the block with respect to which synchronization is to be provided allows the instance of the process to modify an object located on a system separate from the stateless process execution engine and prevents the one or more other instances of the process running on the same application user interface page from modifying the object located on the system separate from the stateless process execution engine.

2. The method of claim 1, wherein the development platform is configured to include in the programmatically generated application code a synchronization code configured to ensure that synchronization is provided with respect to the block of the process with respect to which synchronization is to be provided.

3. The method of claim 1, wherein securing on behalf of the process instance a current turn to perform the block with respect to which synchronization is to be provided includes attempting to access a synchronization or other control object associated with the block with respect to which synchronization is to be provided.

4. The method of claim 3, wherein securing the current turn includes obtaining a lock with respect to the synchronization or other control object.

5. The method of claim 3, wherein securing the current turn includes determining at least initially that the synchronization or other control object is locked by or on behalf of another instance of the process, and making a renewed attempt after a prescribed interval to access the synchronization or other control object.

6. The method of claim 1, wherein said block of the process with respect to which synchronization is to be provided is associated with accessing a resource.

7. The method of claim 6, wherein the resource comprises a data object.

8. The method of claim 6, wherein the resource comprises a portion of code.

9. The method of claim 1, wherein synchronization is provided among a plurality of threads running in a runtime or other environment.

10. The method of claim 1, wherein synchronization is provided among a plurality of instances running across a plurality of runtime or other environments.

11. The method of claim 1, wherein the application process definition is provided by an application developer using a development tool.

12. The method of claim 1, further comprising:
requesting a stateless process execution engine to perform stateless processing with respect to at least a part of the process; and
in response to receiving the request to perform stateless processing with respect to at least at part of the process, determining, by a stateless process execution engine, whether a synchronization is defined with respect to the process.

13. The method of claim 1, further comprising:
requesting a stateless process execution engine to perform stateless processing with respect to at least a part of the process; and
in response to receiving the request to perform stateless processing with respect to at least at part of the process, determining, by a stateless process execution engine, one or more blocks of the process with respect to which process synchronization is to be performed.

14. The method of claim 1, wherein displaying the process definition includes depicting the process definition sequentially.

15. A system to synchronize stateless process execution, comprising:
a processor configured to:
receive, by a stateless process execution engine, an indication that an instance of a process with respect to which stateless execution is being performed is to enter a block of the process with respect to which synchronization with one or more other instances of the process is to be provided, wherein the indication is provided according to an application process definition, wherein the application process definition identifies one or more instances of the process running on a same application user interface page to which synchronization is to be provided, wherein the block of the process with respect to which synchronization is to be provided is identified in a process definition associated with the process, wherein the process definition is associated with a development tool user interface, wherein the development tool user interface includes an interface to graphically select one or more blocks of the process definition when displaying the process definition, wherein the graphical selection causes synchronization to be provided to the one or more selected blocks, wherein the development tool user interface is associated with a development platform configured to generate programmatically application code to implement the process, via execution of one or more instances of the process running on the same application user interface page in a stateless process engine;
secure, by the stateless process execution engine, on behalf of the instance of the process a current turn to perform the block with respect to which synchronization is to be provided; and
allow, by the stateless process execution engine, the block with respect to which synchronization is to be provided to be performed by the instance of the process, wherein the block with respect to which synchronization is to be provided allows the instance of the process running on the same application user interface page to modify an object located on a system separate from the stateless process execution engine and prevents the one or more other instances of the process running on the same application user interface page from modifying the object located on the system separate from the stateless process execution engine; and
a memory coupled to the processor and configured to provide the processor with instructions.

16. The system of claim 15, wherein said block of the process with respect to which synchronization is to be provided is associated with accessing a resource.

17. The system of claim 15, wherein displaying the process definition includes depicting the process definition sequentially.

18. A computer program product to synchronize stateless process execution, the computer program product being embodied in a non-transitory computer readable storage medium and comprising computer instructions for:
receiving, by a stateless process execution engine, an indication that an instance of a process with respect to which stateless execution is being performed is to enter a block of the process with respect to which synchronization with one or more other instances of the process is to be provided, wherein the indication is provided according to an application process definition, wherein the application process definition identifies one or more instances of the process running on the same application user interface page to which synchronization is to be provided, wherein the block of the process with respect to which synchronization is to be provided is identified in a process definition associated with the process, wherein the process definition is received via a development tool user interface, wherein the development tool user interface includes an interface to graphically select one or more blocks of the process definition when displaying the process definition, wherein the graphical selection causes synchronization to be provided to the one or more selected blocks, wherein the development tool user interface is associated with a development platform configured to generate programmatically application code to implement the process, via execution of one or more instances of the process running on the same application user interface page in a stateless process engine;
securing, by the stateless process execution engine, on behalf of the instance of the process a current turn to perform the block with respect to which synchronization is to be provided; and
allowing, by the stateless process execution engine, the block with respect to which synchronization is to be provided to be performed by the instance of the process running on the same application user interface page, wherein the block with respect to which synchronization is to be provided allows the instance of the process to modify an object located on a system separate from the stateless process execution engine and prevents the one or more other instances of the process running on the same application user interface page from modifying the object located on the system separate from the stateless process execution engine.

19. The computer program product of claim 18, wherein displaying the process definition includes depicting the process definition sequentially.

\* \* \* \* \*